(12) United States Patent
Liu

(10) Patent No.: US 8,693,114 B2
(45) Date of Patent: Apr. 8, 2014

(54) SLIDING MECHANISM AND ELECTRONIC DEVICE USING THE SAME

(75) Inventor: Ching-Wei Liu, Taoyuan (TW)

(73) Assignee: Azurewave Technologies, Inc., New Taipei (TW)

( * ) Notice: Subject to any disclaimer, the term of this patent is extended or adjusted under 35 U.S.C. 154(b) by 13 days.

(21) Appl. No.: 13/535,386

(22) Filed: Jun. 28, 2012

(65) Prior Publication Data

US 2013/0279028 A1 Oct. 24, 2013

(30) Foreign Application Priority Data

Apr. 18, 2012 (TW) .............................. 101207188 A

(51) Int. Cl.
G02B 7/02 (2006.01)

(52) U.S. Cl.
USPC .......................................... 359/813; 359/811

(58) Field of Classification Search
USPC .................................. 359/694–704, 811–830
See application file for complete search history.

(56) References Cited

U.S. PATENT DOCUMENTS

| 7,775,816 B1 * | 8/2010 | Huang et al. ................... 439/159 |
| 2006/0072916 A1 * | 4/2006 | Liu ............................... 396/177 |

* cited by examiner

*Primary Examiner* — Mohammed Hasan
(74) *Attorney, Agent, or Firm* — Li & Cai Intellectual Property (USA) Office

(57) ABSTRACT

The instant disclosure relates to a lens structure, which includes a mounting seat, a sliding carriage, a lens cover, and at least one elastic member, wherein the mounting seat has a first through-hole formed thereon and defines two operating positions, the sliding carriage slidably coupled to the mounting seat and having a second through-hole formed thereon, wherein the second through-hole corresponds to the first through-hole in one operating position, the lens cover arranged on the sliding carriage and having a plurality of heat-dissipating holes formed thereon in correspondence with the second through-hole, one end of the elastic member fixed to the mounting seat, and the other end of the elastic member fixed to the sliding carriage, wherein the sliding carriage is urged to move a predetermined distance form one operating position, the elastic member provides resilient force to drive the sliding carriage to another operating position.

10 Claims, 10 Drawing Sheets

SLIDING MECHANISM AND ELECTRONIC DEVICE USING THE SAME

BACKGROUND OF THE INVENTION

1. Field of the Invention

The instant disclosure relates to a slide cover; in particular, to a lens structure for a portable electric device.

2. Description of Related Art

As portable electronic devices become increasingly popular, users demand additional functions to their taste in opening and closing operation of a device. Conventional portable optical devices (such as a projector) often include an independent cover structure or a manual slide cover structure for protecting their sensitive and fragile onboard optical components. In particular, the independent cover structure has been used most widely. This type device usually includes a plastic or rubber cover to protect a lens and a connecting line to connect the cover to prevent that from missing. When a user wants to cover a lens, the user can fix the cover onto the lens by using a fixing structure, i.e. screw thread or fixing pillar, formed on the inner-wall surface. On the other hand, user can disassemble the cover from the lens by manual operation.

Although the mechanism of said cover structure may be simple, the user receives no interactive feedback from turning on/off power between the cover and the device. If the device starts to project with the cover still un-removed, the intensifying light may cause heat damage to the cover. In addition, for devices having independent un-integrated covers, the user must find a suitable position to place the cover when it is removed during projection, causing much inconvenience.

The device having a manual sliding-type cover usually includes a track module assembled between the cover and the device. When user wants to open the cover to expose the lens, user needs to push the cover to move an overall traveling distance to a specific position. However, the mechanism of the sliding-type cover structure can improve the defects of the independent-type cover structure, but user must push the cover to move an overall traveling distance. In addition, the plastic cover coupled with the track module may cause a difficult movement during the traveling process of the cover.

One clear trend for the light sources of these devices is the reduction in size (both length and thickness). But said improvement may cause generation of excessive heat when the device is operating, and thus induce device malfunction.

To address the above issues, the inventors strive via industrial experience and academic research to present the instant disclosure, which can effectively improve the limitations described above.

SUMMARY OF THE INVENTION

The object of the instant disclosure is to provide a lens structure which is convenient to use. In addition, the electric device having said lens structure can achieve a maximum heat-dissipating efficiency during operating process.

In order to achieve the aforementioned objects, according to an embodiment of the instant disclosure, the lens structure includes a mounting seat, a sliding carriage, a lens cover, and a elastic member. The mounting seat has a first through-hole formed thereon and defines two operating positions, the sliding carriage slidably coupled to the mounting seat and having a second through-hole formed thereon, wherein the second through-hole corresponds to the first through-hole in one operating position, the lens cover arranged on the sliding carriage and having a plurality of heat-dissipating holes formed thereon in correspondence with the second through-hole, one end of the elastic member fixed to the mounting seat, and the other end of the elastic member fixed to the sliding carriage, wherein the sliding carriage is urged to move a predetermined distance form one operating position, the elastic member provides resilient force to drive the sliding carriage to another operating position.

According to another embodiment, the instant disclosure further provides an electronic device having a lens structure and a main body. The main body includes a lens and a heat-dissipating structure thermal-conductively connected to the lens, the main body defines a heat-dissipating channel and the heat-dissipating structure arranged therein, the outer wall of the main body defines an opening corresponding to the lens and a plurality of apertures near the opening.

The lens structure includes a mounting seat, a sliding carriage, a lens cover, and a elastic member. The mounting seat has a first through-hole formed thereon and defines two operating positions, the sliding carriage slidably coupled to the mounting seat and having a second through-hole formed thereon, wherein the second through-hole corresponds to the first through-hole in one operating position, the lens cover arranged on the sliding carriage and having a plurality of heat-dissipating holes formed thereon in correspondence with the second through-hole, one end of the elastic member fixed to the mounting seat, and the other end of the elastic member fixed to the sliding carriage, wherein the sliding carriage is urged to move a predetermined distance form one operating position, the elastic member provides resilient force to drive the sliding carriage to another operating position.

Therefore, when the sliding carriage move to one operating position together with the lens cover, the first through-hole, the second through-hole, and a part of the heat-dissipating holes of the lens structure are all communicates with the heat-dissipating channel of the main body for achieving a maximum heat-dissipating efficiency. In addition, when user wants to open or close the lens of the electronic device, user can push the lens cover to a predetermined traveling distance form one operating position, and the lens cover will automatically move to another operating position by the resilient force of the elastic member for achieving a self-automatically open movement or a self-automatically close movement.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

Figure 1:
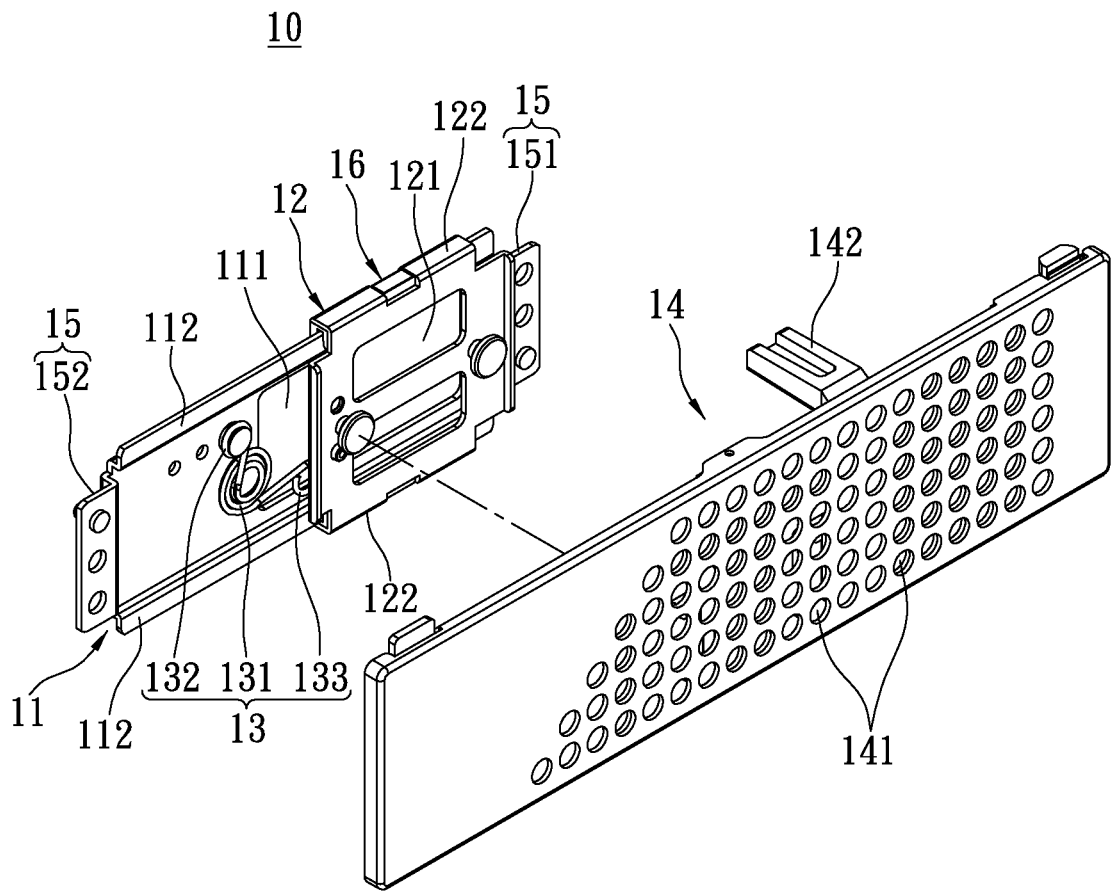
FIG. 1 shows an assembled view of a lens structure according to a first embodiment of the instant disclosure.

Please refer to FIG. 1, which shows a lens structure 10 in accordance to an embodiment of the instant disclosure. The lens structure 10 includes a mounting seat 11, a sliding carriage 12, at least one elastic member 13, and a lens cover 14.

The mounting seat 11 has at least one first through-hole 111 formed thereon and defines an open position and a close position. The sliding carriage 12 is slidably coupled to the mounting seat 11 and has at least one second through-hole 121 formed thereon. The elastic member 13 is connected to the mounting seat 11 and the sliding carriage 12 for controlling the sliding operation of the sliding carriage 12 against the mounting seat 11. The lens cover 14 is arranged onto the sliding carriage 12 and has a plurality of heat-dissipating holes formed thereon. Specially, when the sliding carriage 12 move to the open position, the heat-dissipating holes correspond to the first through-hole 111 and the second through-hole 121.

In this exemplary embodiment, the mounting seat 11 is made of a suitable material, such as, a metal material. The sliding carriage 12 is also made of a suitable material, such as, a metal material. The mounting seat 11 defines a first through-hole 111 thereof for increasing the heat dissipating efficiency, and the number and shape of the first through-hole 111 are not restricted. In addition, the mounting seat 11 is provided with two guiding members 112 extended from the respective two ends of the mounting seat 11. Each guiding member 112 is L-shaped guiding track, but is not restricted thereto. In various embodiments, each guiding member 112 can be a guiding pin.

The length of the sliding carriage 12 is smaller than that of the mounting seat 11. The sliding carriage 12 defines a second through-hole 121 thereof for increasing the heat dissipating efficiency, and the number and shape of the second through-hole 121 are not restricted. In addition, the sliding carriage 12 is provided with two sliding units 122 which are slidably coupled to the respective guiding members in the moving direction. Thereby, the sliding carriage 12 can move between the open position and the close position of the mounting seat 11. General speaking, the number and the shape of the first through-hole 111 and the second through-hole 121 are not restricted.

The elastic member 13 is arranged between the mounting seat 11 and the sliding carriage 12. The elastic member 13 includes a vortical body 131, a first leg 132, and the second leg 133. The vortical body has a large-arched part and a small-arched part, and said both are defined on opposite sides of the vortical body. The first leg 132 is extended form the small-arched part to fix on the mounting seat 11, and the second leg 133 is extended form the large-arched part to fix on the sliding carriage 12.

The lens structure 10 further comprises a fixing mechanism 15 having a front stops 151 and a rear stops 152. The front stops 151 is arranged on one side of the mounting seat 11, and the rear stops 152 is arranged on the other side of the mounting seat 11 so that the sliding carriage 12 can reciprocate between said two operating positions. Concretely speaking, one of the operating positions which the sliding carriage 12 contacts with the front stops 151 is defined as an open position (as shown in FIG. 4B). The other one of the operating positions which the sliding carriage 12 contacts with the rear stops 152 is defined as a close position (as shown in FIG. 5B). In addition, the structure and connecting type of the fixing mechanism 15 are not restricted. In various embodiments, the fixing mechanism 15 can be arranged on the mounting seat 11 in combination.

Figure 2:
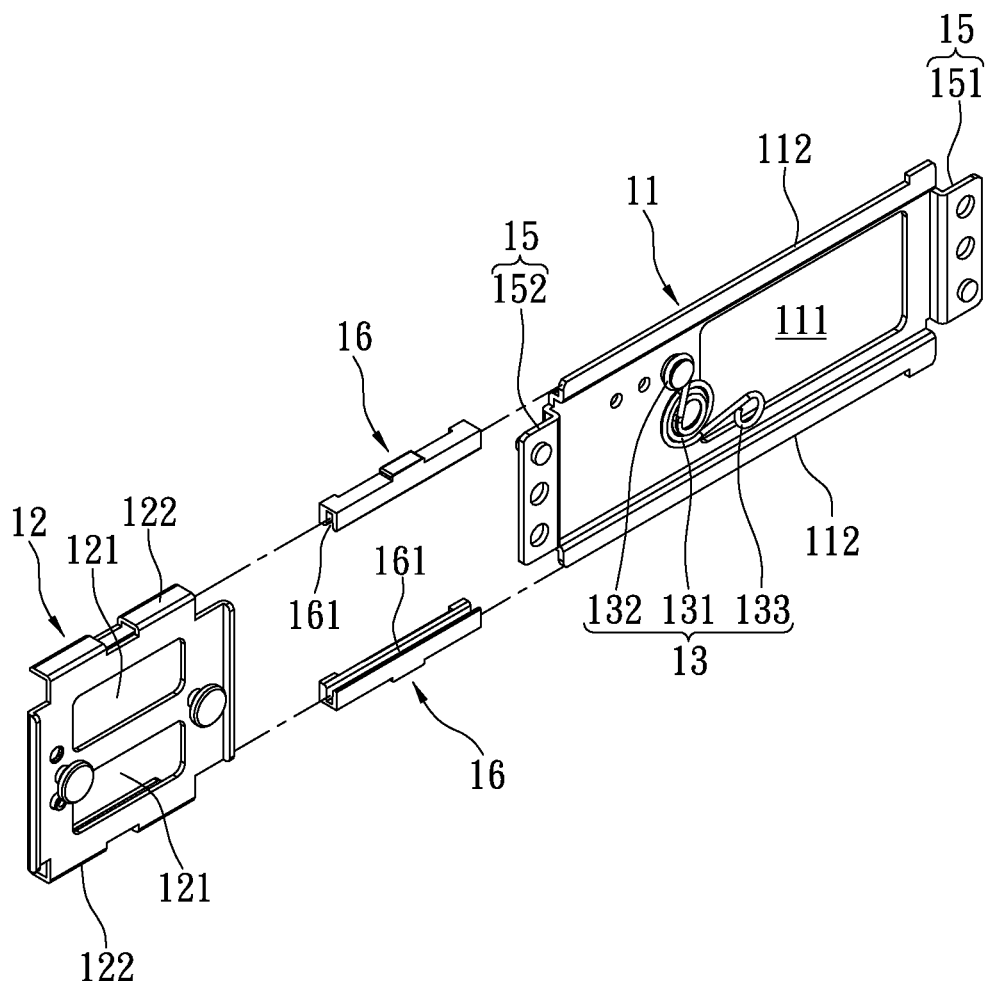
FIG. 2 shows an exploded view of a lens structure according to an embodiment of the instant disclosure.
Figure 2A:
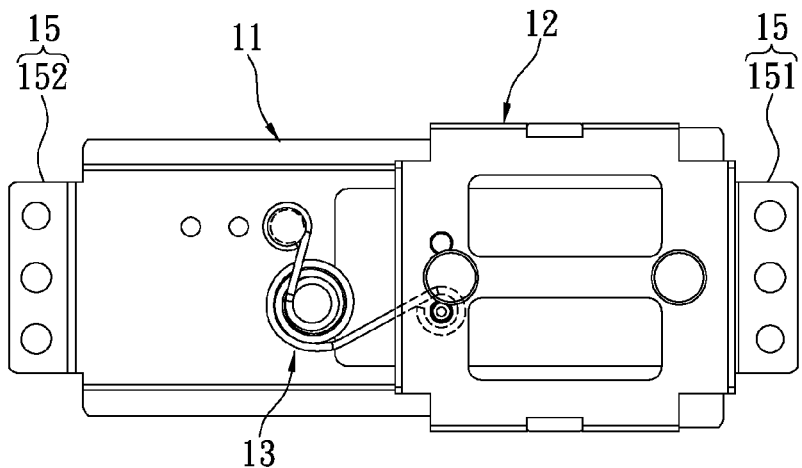
FIG. 2A shows an cross-section view of a lens structure according to an embodiment of the instant disclosure.
Figure 2B:
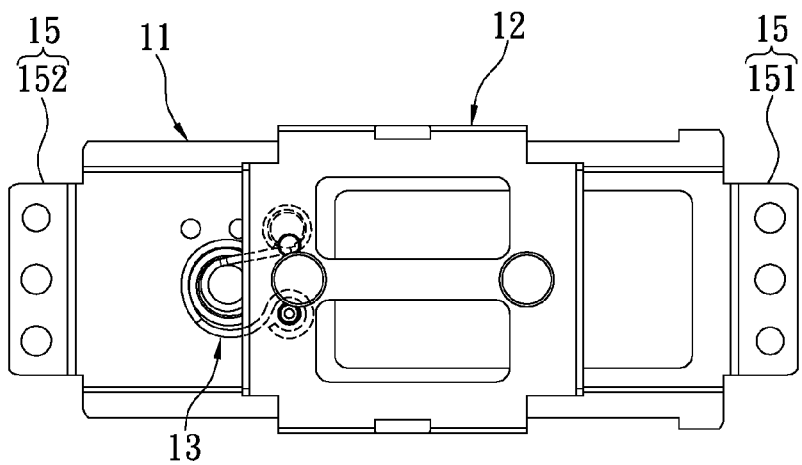
FIG. 2B shows another cross-section view of a lens structure according to an embodiment of the instant disclosure.
Figure 2C:
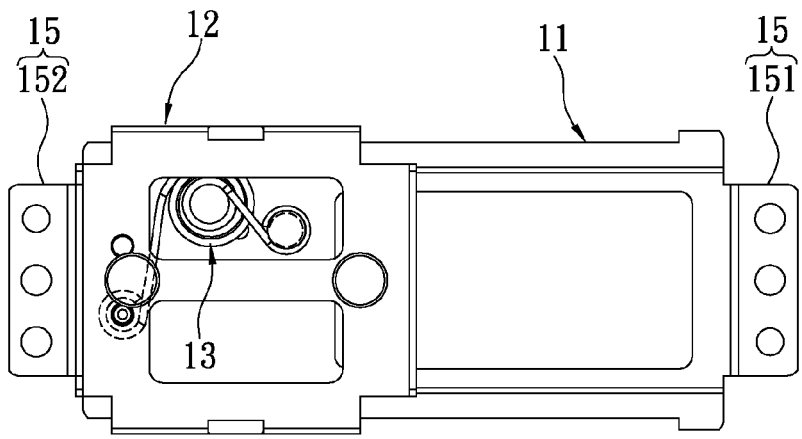
FIG. 2C shows an extra cross-section view of a lens structure according to an embodiment of the instant disclosure.

Please refer to FIG. 2, it shows that the lens structure 10 can further comprise two plastic elements 16. The plastic elements 16 are embedded in the sliding units 122 of the sliding carriage 12, and each plastic element defines a sliding groove 161 thereof. Thereby, the guiding members 111 of the metallic mounting seat 11 can be inserted into the respective sliding grooves 161 of the plastic elements 16 to improve the smooth degree and avoid the noise while the sliding carriage 12 is moving between said operating positions.

Lens cover 14 is arranged on the sliding carriage 12 to achieve a linking-up relationship with that. The lens cover defines a plurality of heat-dissipating holes 141 thereof, but the number and shape of the holes 141 are not restricted. Specially, while the lens cover moves to the open position, a part of heat-dissipating holes 141 corresponds to the first through-hole 111 and the second through-hole 121 to achieve maximum heat-dissipating efficiency. In other words, heat can be transmitted through the first through-hole 111, the second through-hole 121, and the heat-dissipating holes 141.

Base on above, the assembling process of the lens structure 10 comprising the following steps. The first step is to fix the first leg 132 of the elastic member 13 to a fixing pin (not shown) of the mounting seat 11. The next step is to fix the second leg 133 of the elastic member 13 to a fixing pin (not shown) of the sliding carriage 12. The next step is to install the guiding members 112 of the mounting seat 11 into the sliding grooves 161 of the plastic elements which is embedded in the sliding units 122 of the sliding carriage 12. The last step is to fix the lens cover 14 onto the sliding carriage 12 through a plurality of fixing elements, i.e. screws.

Please refer to FIGS. 1 and 2A to 2C, the operation of this embodiment will be explained hereinafter. When the lens cover 14 is pushed by a hand to move a predetermined distance form one operating position (open position or close position), the lens cover 14 slides together with the sliding carriage 12. As this time, the big arched part of the vortical body 131 expands outwardly by exerting a force and the small arched part of the vortical body 131 dose not generate deformation. However, after passing the transition point of the elastic member 13, the resilient force of the elastic member 13 is exerted in opposite direction. Thereby, the sliding carriage 12 is automatically moved to another operating position (open position or close position) together with the lens cover 14 without exerting any force to the lens cover.

Concretely, the sliding carriage 12 is urged on condition that moving a 40% traveling distance form close position, the sliding carriage 12 will automatically move to open position by the resilient force of the elastic member 13 to achieve a self-automatically open movement or self-automatically close movement, and vice versa.

Figure 3:
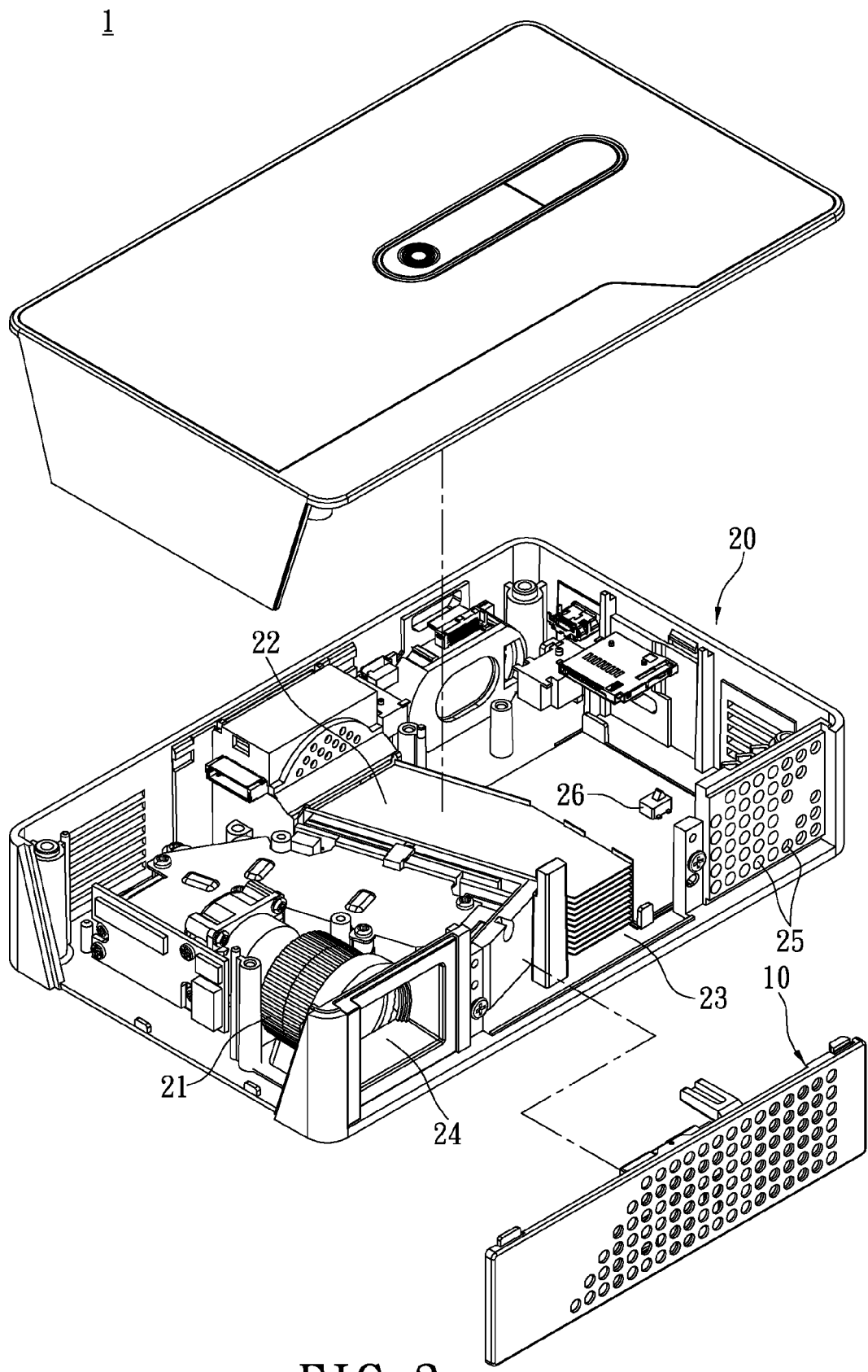
FIG. 3 shows an assembled view of a electric device according to an embodiment of the instant disclosure.

Please refer to FIG. 3, which shows an electronic device 1 in accordance to another embodiment of the instant disclosure. Hereinafter, the illustration of this embodiment will be explained by using a projector as an example. The electronic device 1 includes a lens structure 10 and a main body 20 having a lens 21 and a heat-dissipating structure 22 thermal-conductively connected to the lens 21. The main body 20 defines a heat-dissipating channel 23 and the heat-dissipating structure 22 arranged therein. In addition, the outer wall of the main body 20 defines an opening 24 corresponding to the lens 21 and a plurality of apertures 25 near the opening 24. Specially, when the lens structure 10 is assembled on the main body 20, the first through-hole 111, the second through-hole 121, and a part of the heat-dissipating holes 141 of the lens structure 10 are all communicates with the heat-dissipating channel 23 of the main body 20 for achieving a maximum heat-dissipating efficiency.

Figure 4A:
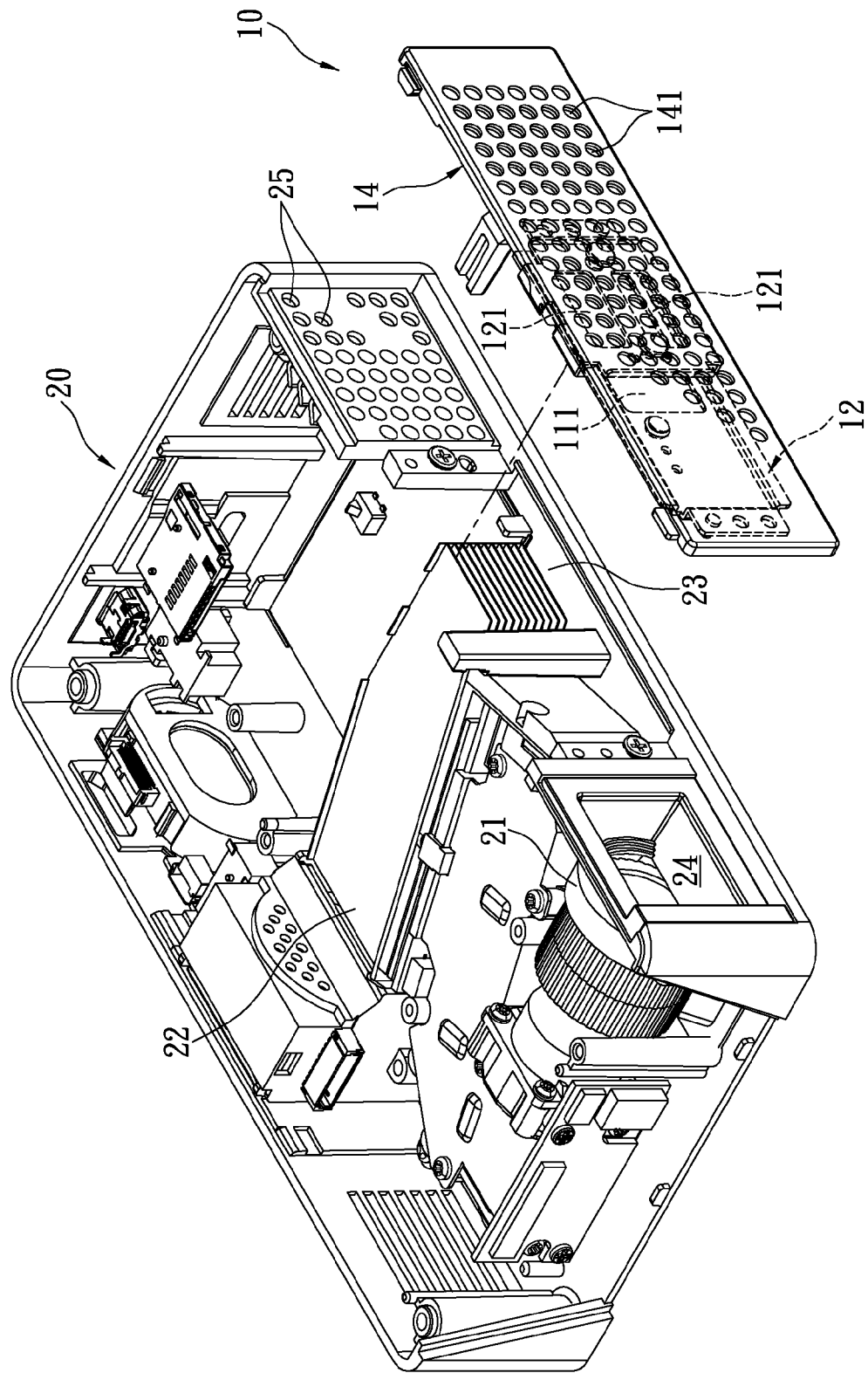
FIG. 4A shows an exploded view of a electric device according to an embodiment of the instant disclosure.
Figure 4B:
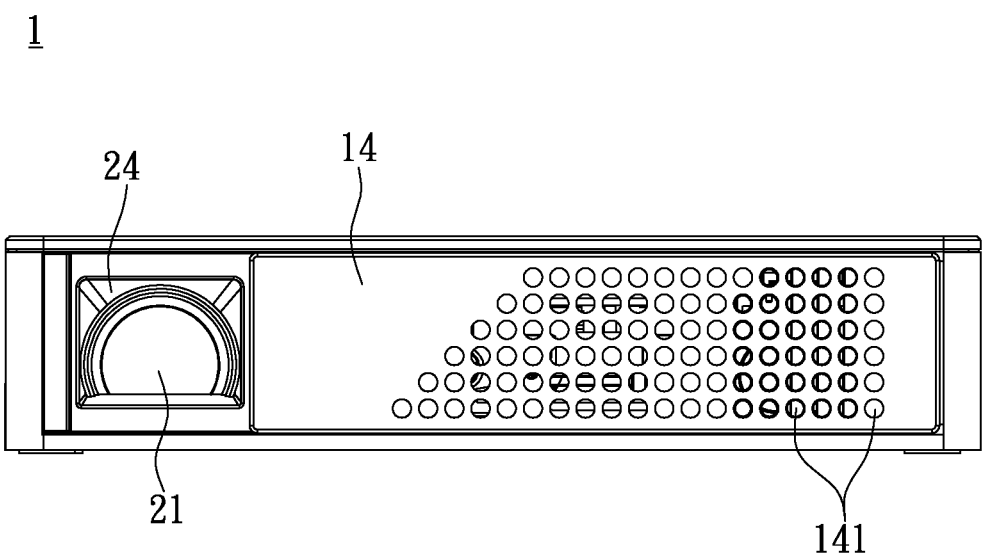
FIG. 4B shows an cross-section view of a electric device according to an embodiment of the instant disclosure.
Figure 5A:
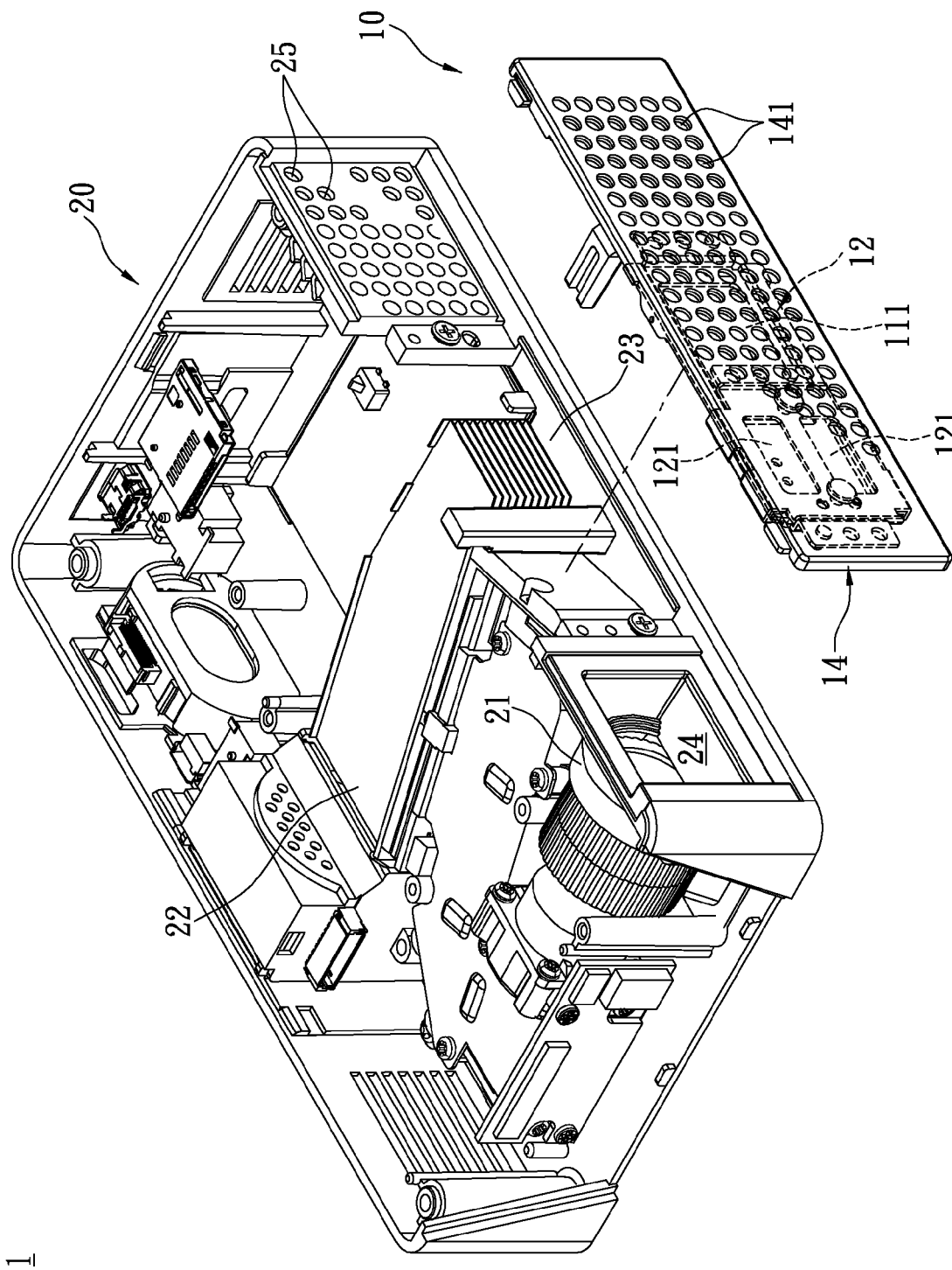
FIG. 5A shows another exploded view of a electric device according to an embodiment of the instant disclosure.
Figure 5B:
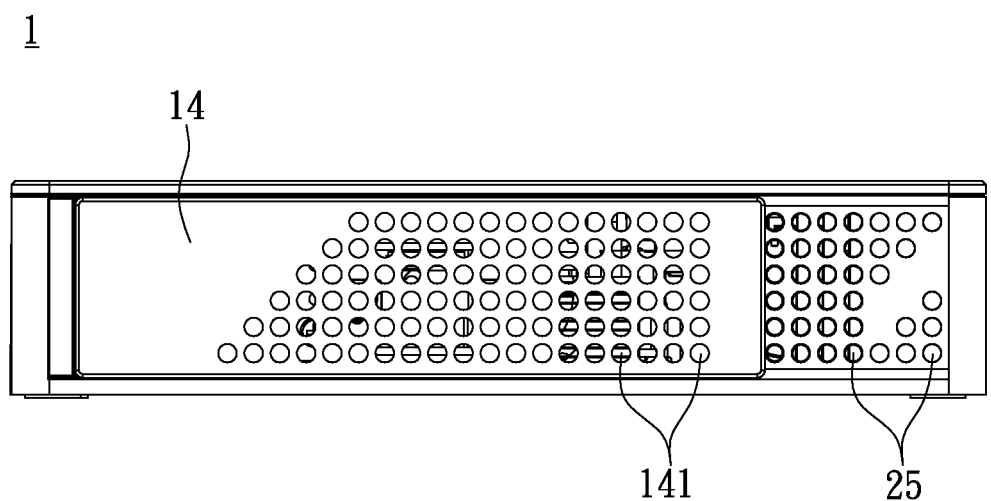
FIG. 5B shows another cross-section view of a electric device according to an embodiment of the instant disclosure.

Please refer to FIGS. 4A and 4B, when user want to operate the electric device 1, user can push the lens cover 14 to move a 40% traveling distance from the close position, and the lens cover 14 will automatically move to the open position for exposing the opening 24 and the lens 21. Please refer to FIGS. 5A and 5B, when user want to shut the electric device 1, user can push the lens cover 14 to move a 40% traveling distance from the open position, and the lens cover 14 will automatically move to the close position for covering the opening 24 and the lens 21.

Specially, when the electric device 1 is operating and the lens cover 14 and the sliding carriage 12 are both at the open position. The first through-hole 111, the second through-hole 121, and a part of the heat-dissipating holes 141 of the lens structure 10 are all communicates with the heat-dissipating channel 23 of the main body 20. Thereby, heat generating by the electric device 1 will be directly transmitted from the heat-dissipating structure 22 to atmosphere through the first through-hole 111, the second through-hole 121, and a part of the heat-dissipating holes 141. Heat will not be blocked by the lens structure 10 during the heat-transmitting process.

Figure 6A:
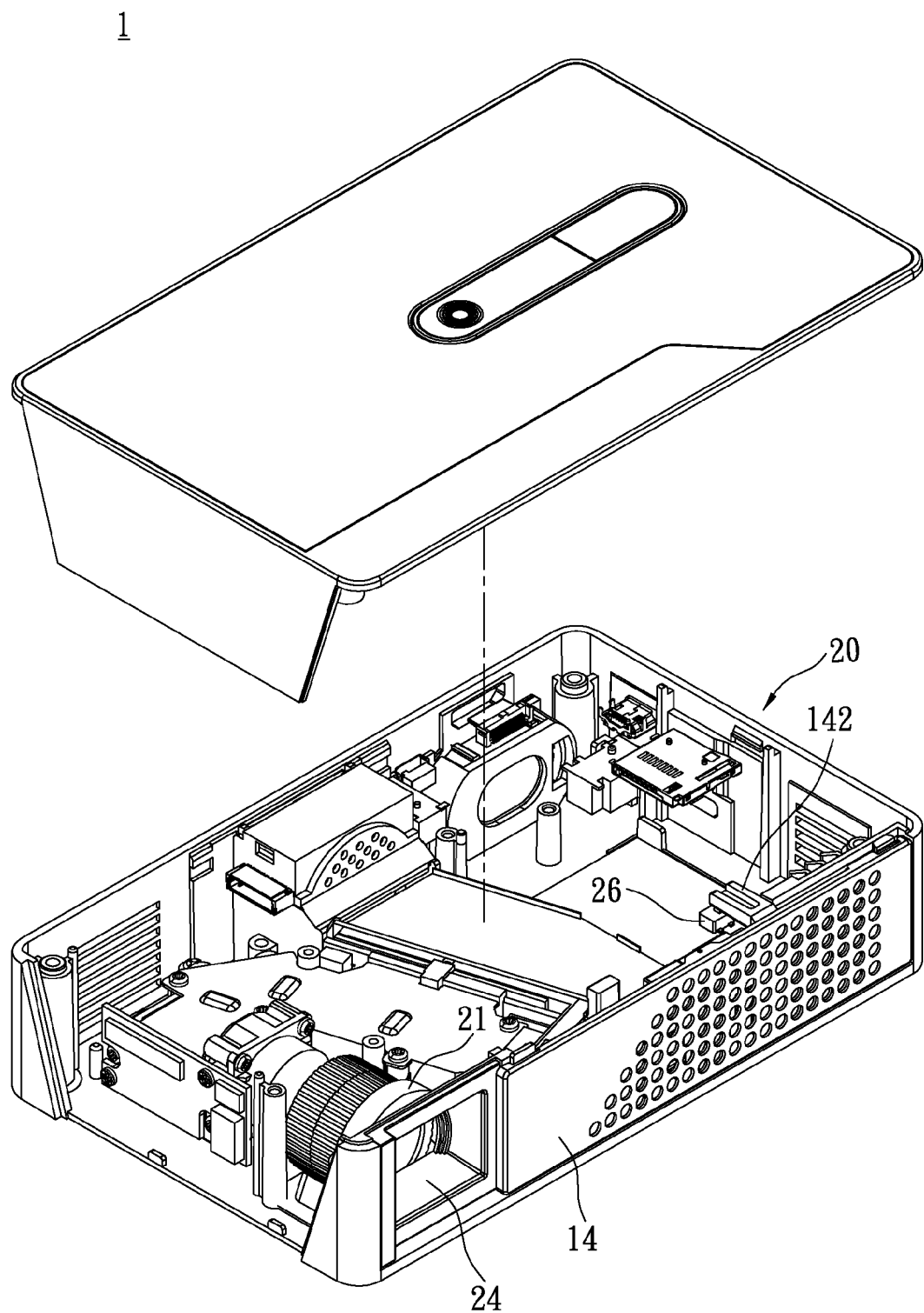
FIG. 6A shows an assembled view of one operating position of a electric device according to a various embodiment of the instant disclosure.

Please refer to FIG. 6A, the electric device 1 can further comprise a sensor 26 which electrically connects to the power switch (not shown) through its motherboard. The lens cover 14 can further comprise a contacting structure 142, and the contacting structure 142 is extended from one end thereof. When the lens cover 14 moves to the open position and expose the lens, the contacting structure 142 of the lens cover 14 can correspond with the sensor 26 of the electric device 1. Thereby, the electric device 1 will transmit signal to let the motherboard identify that now the lens cover 14 belongs to the open position, and then the motherboard will initiate the power switch to turn on the electric device 1.

Figure 6B:
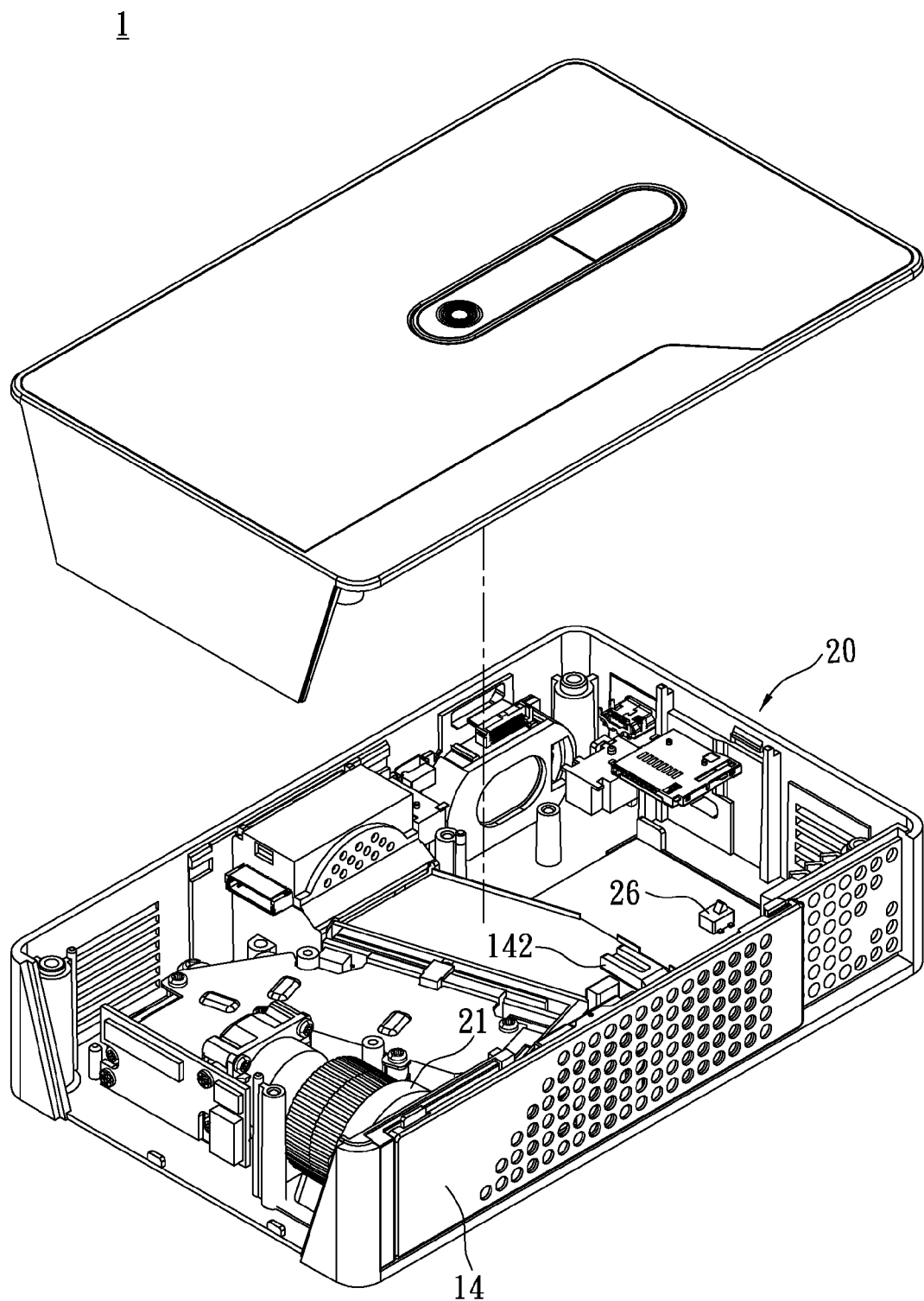
FIG. 6B shows an assembled view of another operating position of a electric device according to a various embodiment of the instant disclosure.

Please refer to FIG. 6B, the lens cover 14 moves to the close position and cover the lens, the contacting structure 142 of the lens cover 14 belong to a position far the sensor 26 of the electric device 1. Thereby, the electric device 1 will transmit signal to let the motherboard identify that now the lens cover 14 belongs to the close position, and then the motherboard will turn off the power switch to shut down the electric device 1 for promoting the convenience in use.

Base on above, the in comparison with prior art, the lens structure and the electric device of the present invention has the following advantages:
1. When the lens cover is urged on condition that moving a 40% traveling distance form the close position together with the sliding carriage, said both will automatically move to the open position by the resilient force of the elastic member for achieving a self-automatically open movement or a self-automatically close movement. In addition, by utilizing the guiding members of the metallic mounting seat coupled with the respective sliding grooves of the plastic elements can improve the smooth degree and avoid the noise while the sliding carriage is moving between said operating positions.
2. When the lens cover moves to the open position together with the sliding carriage, the first through-hole, the second through-hole, and a part of the heat-dissipating holes of the lens structure are all communicates with the heat-dissipating channel of the main body for achieving a maximum heat-dissipating efficiency.
3. By the interacting relationship of the contacting structure of the lens cover and the sensor of the electronic device. Thereby, when the lens cover moves to the open position, the motherboard will initiate the power switch to turn on the electric device without manual operation, and vice versa. Moreover, said interacting relationship can also avoid the danger that the electric device is still working when the lens cover belongs to the close position.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:
1. An electronic device, comprising:
a main body comprising:
  a lens, and
  a heat-dissipating structure thermal-conductively connected to the lens,
wherein the main body defines a heat-dissipating channel and the heat-dissipating structure arranged therein,
wherein the outer wall of the main body forms a opening corresponding to the lens and a plurality of apertures near the opening; and
a lens structure comprising:
  a mounting seat, having a first through-hole formed thereon,
    a sliding carriage, coupled to the mounting seat and slidable between two operating positions along a sliding axis, having a second through-hole formed thereon, wherein the second through-hole correspondingly aligns the first through-hole in one of the two operating position,
  at least one elastic member, having one end coupled to the mounting seat and the other end coupled to the sliding carriage,
wherein when the sliding carriage is urged to move a predetermined distance form one of the two operating positions, the elastic member provides resilient force to drive the sliding carriage toward the other operating position.

2. The electronic device according to claim 1, wherein the coupling locations for the two ends of the elastic member on the mounting seat and the sliding carriage respectively offset each other along the sliding axis.

3. The electronic device according to claim 2, wherein the elastic member is a torsion spring having a first leg and a second leg, wherein the first leg is pivotally coupled to the mounting seat while the second leg is pivotally coupled to the sliding carriage.

4. The electronic device according to claim 3, wherein the elastic member has a vortical body having a small-arched end and a large-arched end, wherein the first leg extends from the small-arched end while the second leg extends from the large-arched end.

5. The electronic device of claim 1, further comprising a lens cover, arranged on the sliding carriage having a plurality of heat-dissipating holes formed thereon in corresponding alignment with the second through-hole.

6. The electronic device according to claim 1, wherein the main body has a sensor arranged thereon, the lens cover has a contacting structure extended thereon, when the second through-hole corresponds to the first through-hole in one operating position, the contacting structure near the sensor.

7. The electronic device according to claim 1, wherein the mounting seat has a pair guiding members, the sliding carriage has a pair sliding units slidably engaged with the guiding members.

8. The electronic device according to claim 7, further comprising a pair plastic elements embedded in the sliding units, each plastic element has a sliding groove formed thereon, and the guiding members of the mounting seat inserted into the sliding grooves of the plastic elements.

9. The electronic device according to claim 1, further comprising a fixing mechanism having a front stops arranged on one side of the mounting seat and a rear stops arranged on the other side of the mounting seat.

10. The electronic device according to claim 1, wherein the elastic member has a vortical body having a small-arched end and a large-arched end, a first leg extended from the small-arched end, and a second leg extended from the large-arched end, the first leg connected to the mounting seat and the second leg connected to the sliding carriage.

\* \* \* \* \*